United States Patent
Cross et al.

[11] 3,907,825
[45] Sept. 23, 1975

[54] 1,2-DIALKYL-3,5-DISUBSTITUTED PYRAZOLIUM SALTS AND THE USE THEREOF AS HERBICIDAL AGENTS

[75] Inventors: Barrington Cross, Rocky Hill; Bryant Leonidas Walworth, Pennington, both of N.J.

[73] Assignee: American Cyanamid Company, Stamford, Conn.

[22] Filed: Sept. 21, 1973

[21] Appl. No.: 399,785

[52] U.S. Cl.................. 260/311; 260/310 R; 71/92
[51] Int. Cl.² .................. C07D 231/12; A01N 9/22
[58] Field of Search............................ 260/310, 311

[56] References Cited
FOREIGN PATENTS OR APPLICATIONS
2,260,485  1/1973  Germany Primary Examiner—Donald B. Moyer
Attorney, Agent, or Firm—Harry H. Kline

[57] ABSTRACT

This invention relates to novel 1,2-dialkyl-3,5-disubstituted pyrazolium salts of the structure:

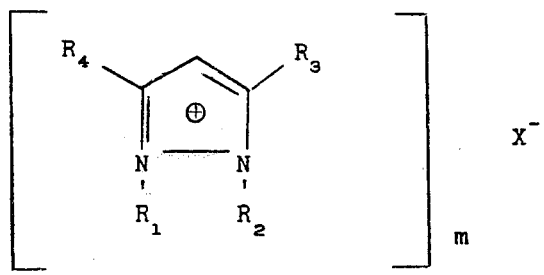

wherein $R_1$ and $R_2$ each represent $C_1$-$C_4$ alkyl; $R_3$ is cyclo-alkylmethyl of 3-7 carbon atoms, a cycloalkyl of 3-7 carbon atoms, methylcycloalkyl of 3-7 carbon atoms, cycloalkenyl of 3-7 carbon atoms, methylcycloalkenyl of 3-7 carbon atoms,

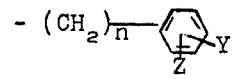

or alkyl (from 2 to 11 carbon atoms); $R_4$ is cycloalkylmethyl of 3-7 carbon atoms, cycloalkyl of 3-7 carbon atoms, methyl cycloalkyl of 3-7 carbon atoms, $C_2$-$C_{11}$ alkyl or

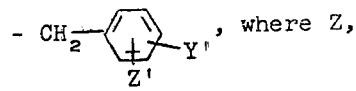

where Z, Z', Y and Y' each represent hydrogen, halogen, nitro, methylthio, methylsulfonyl, cyano, carboxyl, carbalkoxy of 1-4 carbon atoms, alkyl of 1-8 carbon, haloalkyl of 1-4 carbon atoms and containing 1-4 halogen atoms, or alkoxy of from 1-4 carbon atoms; X is an anion with a charge of from 1 to 3; n is 0 or 1; and m is an integer from 1 to 3, and to a method for the control of undesirable plant species therewith. There is also provided a method for the selective control of certain broadleaf weeds and undesirable grass plants with the above mentioned compounds.

11 Claims, No Drawings

1,2-DIALKYL-3,5-DISUBSTITUTED PYRAZOLIUM SALTS AND THE USE THEREOF AS HERBICIDAL AGENTS

This invention relates to pyrazolium compounds having the structure:

(I) 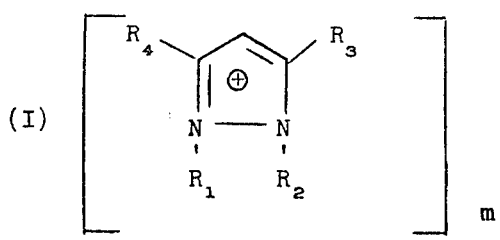

wherein $R_1$ and $R_2$ each independently represent alkyl $C_1$–$C_4$; $R_3$ represents a member selected from the group consisting of cycloalkylmethyl $C_3$–$C_7$, cycloalkyl $C_3$–$C_7$, methyl substituted cycloalkyl $C_3$–$C_7$, cycloalkenyl $C_3$–$C_7$, methyl substituted cycloalkenyl $C_3$–$C_7$,

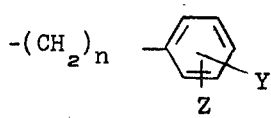

and alkyl $C_2$–$C_{11}$; $R_4$ represents a member selected from the group consisting of cycloalkylmethyl $C_3$–$C_7$, cycloalkyl $C_3$–$C_7$, methyl-substituted cycloalkyl $C_3$–$C_7$, cycloalkenyl $C_3$–$C_7$, methyl-substituted cycloalkenyl $C_3$–$C_7$ alkyl $C_2$–$C_{11}$ and

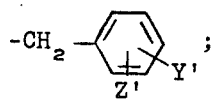

Y, Y′, Z and Z′ each represent members selected from the group consisting of hydrogen, halogen, nitro, methylthio, methylsulfonyl, cyano, carboxyl, carboalkoxy $C_1$–$C_4$, alkyl $C_1$–$C_4$, haloalkyl $C_1$–$C_4$ containing 1 to 4 halogen atoms and alkoxy $C_1$–$C_4$; X represents an anion with a charge of from 1 to 3; n is 0 or 1 and m is an integer selected from 1, 2 and 3. The invention also relates to a method for controlling undesirable plant species with the hereinabove defined compound.

In accordance with the process of this invention, the formula (I) pyrazolium salts having the structure:

(I) 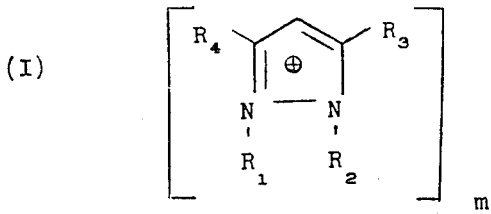

where $R_1$, $R_2$, $R_3$, $R_4$, $m$ and X are as described above, can be prepared by reacting a methyl ketone with a carboxylic acid ester, preferably the methyl or ethyl ester, in the presence of an alkali metal hydride, preferably sodium hydride, and an aprotic solvent, such as dimethyl sulfoxide (DMSO), dimethyl formamide (DMF), xylene, toluene, benzene or the like. The reaction, is generally carried out at a temperature between 0°C. and 40°C. and preferably between 0°C. and 25°C. The reaction yields the β-diketone corresponding to the reactants employed. It is a good practice to react the methyl ketone and carboxylic acid ester in approximately equimolar amounts. However, it is generally desirable to employ a slight excess, i.e. up to about 10% excess, of the carboxylic acid ester. The reaction can be illustrated as follows:

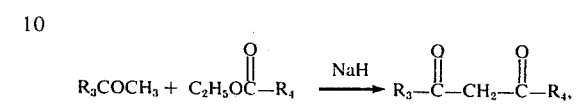

wherein $R_3$ and $R_4$ are as defined above.

The diketone is then condensed with either hydrazine or a $C_1$–$C_4$ alkyl hydrazine to form the corresponding 3,5-disubstituted pyrazole. Thereafter, the pyrazole is alkylated to form the desired formula (I) pyrazolium salt. These reactions are graphically illustrated below.

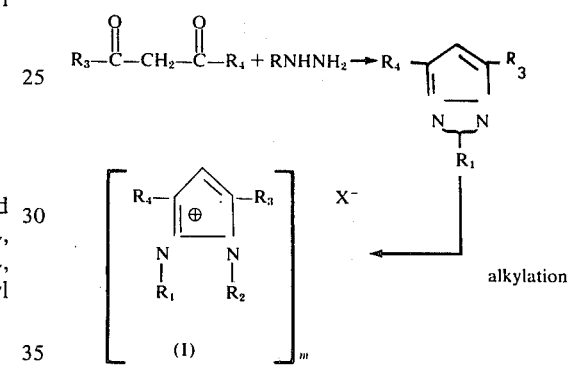

wherein R is hydrogen or alkyl $C_1$–$C_4$ and $R_1$, $R_2$, $R_3$, $R_4$, $m$ and X are as defined above.

The term "halogen," as herein used, is intended to include fluorine, chlorine, iodine or bromine; however, fluorine, chlorine and bromine are preferred.

The terms "alkyl" and "alkoxy" are intended to encompass straight-chain and branched-chain alkyl and alkoxy, including straight and branched haloalkyl and straight and branched carboalkoxy.

Illustrative of the anions which are suitable for use in the present invention are halides, such as chloride, bromide and iodide; sulfate; hydrogen sulfate; methyl sulfate; benzene sulfonate; perchlorate; $C_1$–$C_4$ alkoxy benzene sulfonate; $C_1$–$C_4$ alkyl benzene sulfonate, preferably p-toluene sulfonate; phosphate, $C_1$–$C_4$ alkane sulfonate;

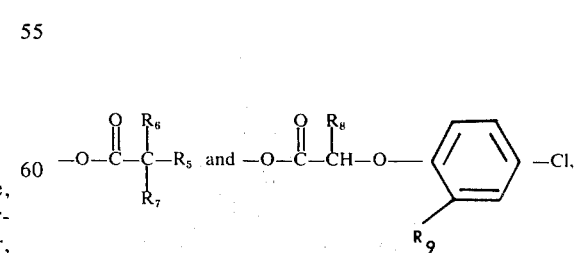

where $R_5$ is halogen, methyl, halomethyl or dihalomethyl; $R_6$ and $R_7$ are halogen; $R_8$ is hydrogen or methyl; and $R_9$ is chlorine or methyl.

In general, equimolar amounts of the diketone with the hydrazine reactants are employed. However, a slight excess (up to about 10 percent of either reactant may be used). This reaction is usually carried out in the presence of a solvent, either protic or aprotic, at a temperature between about 70°C. and 150°C. and preferably between 80°C. and 120°C. Preferred solvents for these reactions are protic solvents, such as the lower alcohols including methanol, ethanol, n-propanol, isopropanol, n-butanol and isobutanol. Aprotic solvents which are suitable for use in these reactions include xylene, toluene, benzene, dimethylsulfoxide, dimethylformamide, and pyridine. The introduction of an acid catalyst, such a p-toluene sulfonic acid, increases the rate of the condensation-cyclization reaction and can be advantageous, if the reaction is preceeding slowly.

Advantageously, when hydrazine is used in the initial condensation of the diketone, alkylation of the resulting pyrazole is accomplished by means of a known alkylating agent, preferably in the presence of an acid acceptor, such as an alkali metal hydroxide, an alkali metal alkoxide or a tertiary organic amine. Preferred acid acceptors encompass sodium or potassium hydroxide, sodium or potassium methoxide, ethoxide, propoxide or t-butoxide, trimethylamine, triethylamine and pyridine.

Alkylations of the pyrazole are usually carried out in the presence of a solvent at a temperature between 50°C. and 200°. and, preferably, between 90°C. and 120°C. Preferred solvents include aromatic hydrocarbons such as toluene, xylene and chlorobenzene; ketones having 4 to 7 carbon atoms such as the methylisobutylketone (MIBK) and methylbutylketone (MBK); $C_2$–$C_5$ alcohols; dipolar aprotic solvents such as dimethyl sulfoxide (DMSO), dimethylformamide (DMF), acetonitrile, nitrobenzene and N,N-dimethylacetamide; and cyclic ethers, such as dioxane and tetrahydrofuran.

Exemplary of the alkylating agents are: alkyl halides, dialkyl sulfates, alkyl phosphates, alkyl hydrogen sulfates, and alkyl toluene sulfonates; with these alkylating agents, the alkyl groups each have 1 to 4 carbon atoms. Among the preferred alkylating reagents are the alkyl halides, such as methyl, ethyl, n-propyl, isopropyl, n-butyl, isobutyl and tert-butyl chlorides and bromides; dialkyl sulfates, alkyl hydrogen sulfates, and toluene sulfonates.

While the 3,5-disubstituted pyrazoles combine with equimolar amounts of the alkylating agent, it is a good practice to employ an excess of alkylating reagent. Mole ratios of alkylating reagent to pyrazole within the range of from 1:1 to 1.5:1 are preferred.

In these alkylation reactions it is frequently found that on cooling of the reaction mixture the solid or oily pyrazolium salt separates and is purified by separation from the organic layer. However, in some instances, particularly those wherein $R_3$ and $R_5$ are highly lipophilic (e.g. the 3,5-dicyclohexyl, 3-cyclohexyl-5-phenyl and 3-dodecyl-5-phenyl compounds), separation of the pyrazolium salt from the organic phase cannot be readily accomplished. In such cases, the product can be obtained by evaporation of the solvent, and dissolving the residue in chloroform, water washing of the chloroform layer and evaporation of the chloroform to obtain the pyrazolium salt as the residue.

Utilizing toluene sulfonates or methylsulfates as alkylating agents, impure or hygroscopic materials are frequently obtained due to anion contaminations (such as $HSO_4^-$ or $SO_4^=$). In such instances, the mixed anion is purified by passing an aqueous solution of this mixture through an anion exchange column. Alternatively, the aqueous solution of mixed anions may be converted to an iodide using aqueous saturated potassium iodide or sodium iodide solution. The latter treatment yields the relatively water-insoluble iodide. Perchlorates are prepared by addition of dilute aqueous perchloric acid to an aqueous pyrazolium salt solution to give the water-insoluble perchlorate. Additionally pure pyrazolium salts, e.g. $CH_3SO_4^-$, $HSO_4^-$, $SO_4^=$ or $Cl^-$ may be converted by the above mentioned procedures of anion exchange chromatography to a new pyrazolium salt, and to iodides and perchlorates as defined above. The pyrazolium halides are prepared as hereinabove described, except that the reaction is conducted in a sealed vessel or glass-lined bomb maintained at a temperature of about 100°C.

The pyrazolium compounds of this invention are useful as herbicidal agents and are particularly effective when applied to the foliage of undesirable plants. They are employed at rates between about 0.25 pound per acre and 10.0 pounds per acre and, preferably, used at rates between 0.50 and 5.0 pounds per acre. Surprisingly, these compounds have utility as mildewcidal agents, when applied to the foliage of plants at rates between about 0.25 and 10.0 pounds per acre.

Formula (1) pyrazolium salts where $R_3$ is phenyl, $R_4$ is alkyl $C_2$–$C_{11}$ (preferably $C_5$–$C_{11}$) and $R_1$, $R_2$, $m$ and $X$ are as defined above, exhibit excellent selective postemergence broadleaf control in the presence of small grains, such as barley, wheat and rice. This is especially surprising, since the known lower homologue, i.e., where $R_4$ is methyl, is ineffective as a herbicidal agent at all rates tested. Surprisingly, these compounds also possess preemergence herbicidal herbicidal activity.

As will be noted below, the Formula (I) pyrazolium salts which are most unusual in their herbicidal effectiveness are those in which $R_4$ represents a cycloalkyl $C_3$–$C_7$ group and $R_1$, $R_2$, $R_3$, $m$ and $X$ are as defined above. Preferred compounds are those in which $R_3$ is cycloalkyl $C_3$–$C_7$ or

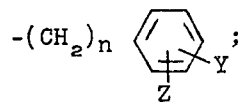

$R_4$ is cycloalkyl $C_3$–$C_7$; $R_1$ and $R_2$ are methyl; and $X$, $Y$, $Z$ and $n$ and $m$ are as defined above. These compounds are highly effective herbicidal agents. They are particularly effective when applied to the foliage of undesirable plants and are active against both broadleaf weeds and undesirable grasses. Moreover, they can be used for selectively controlling wild oats, broadleaf weeds and undesirable grasses especially crab grass, in the presence of small grains such as barley, wheat and rice. Still more surprising is the fact that said compounds also exhibit preemergence herbicidal activity.

Advantageously, many of the formula (I) pyrazolium salts demonstrate a high degree of water solubility and lend themselves to the preparation of aqueous concentrates. Among the preferred salts are the methyl sulfates, hydrogen sulfates, sulfates, chlorides and bromides. In practice, the aqueous concentrates may be applied directly as a liquid spray to the foliage of undesirable broadleaf weeds and grassy plants. Alternatively, they may be further diluted with water and applied as dilute aqueous sprays to these undesirable plants.

The water-miscible concentrates are prepared by dissolving from 15 to 95 percent of the compound in 85 to 5 percent of a water-miscible solvent, such as water itself or another polar water-miscible solvent, such as 2-methoxy ethanol, methanol, propylene glycol, diethylene glycol, diethylene glycol monoethyl ether, formamide, and dimethylformamide. Application of the material is made by adding a predetermined quantity of the water-miscible concentrate to a spray tank and applying the mixture as such or in combination with a suitable dilutent, such as a further quantity of water or one of the above polar solvents.

The performance of the product in all of the above formulations, which are applied as liquid sprays, is unexpectedly improved by adding a surfactant or blend of surfactants. Conventional anionic, cationic and anionicnonionic surfactants may be employed.

Illustrative nonionic surfactants are: alkyl polyoxyethylene ethers, polyoxyethylene (20) sorbitan monolaurate, polyoxyethylene (20) sorbitan monooleate, alkylarylpolyglycol ethers, alkyl phenol ethoxylates, trimethyl nonyl polyethylene glycol ethers, alkyl phenol ethylene oxide condensates, octyl phenoxy polyethoxy ethanols, nonylphenyl polyethylene glycol ethers, condensates of polyoxy ethylenes, polyoxypropylenes, aliphatic polyethers, aliphatic polyesters, alkylaryl polyoxyethylene glycols, and the like.

Exemplary anionic surfactants include sodium dodecylbenzene sulfonate and the dioctyl ester of sodium sulfosuccinic acid.

Suitable cationic surfactants include dicoco dimethylammonium chloride, stearamidopropyl dimethyl betahydroxy-ethylammonium nitrate and the like.

These surfactants are preferably added to the spray tank at the rate of 0.1 to 5 percent by volume to provide good wetting of the spray solution on plant foliage.

Herbicidal concentrates containing surfactants are preferably formulated as aqueous sprays containing approximately 30 percent by weight of the appropriate salt, from about 25 to 50 percent by weight of water and the remainder of said formulation (25–45 percent weight) of a selected surfactant. Surfactants which are especially useful in preparing suitable surfactant containing concentrates include an octylphenol ethylene oxide condensate, an ethanolic solution of an alkyl phenol ethoxylate, a polyglycolic ether condensate produced from ethylene oxide and an alkyl phenol, and an alkyl aryl polyglycolic ether.

Other formulations which may be used to advantage with the compounds of this invention include dusts, dust concentrates and wettable powders.

Dusts are generally prepared by grinding together about 1 to 25 percent by weight of the active agent with from about 99 to 75 percent by weight of a solid diluent such as kaolin, attapulgite, talc, pumice, diatomaceous earth, fullers earth, wood flour, or the like.

Dust concentrates are prepared in similar fashion excepting that about 25 to 95 percent by weight of the active agent is ground with about 75 to 5 percent by weight of the diluent.

Wettable powders are prepared in the same manner as the dust concentrates excepting that about 1 to 5 percent by weight of a dispersing agent such as the calcium salt of a polymerized alkyl aryl sulfonic acid, sodium lignosulfonate, or sodium salt of condensed naphthalene sulfonic acid is blended with the mixture and about 1 to 5 percent of a surfactant, such as polyoxyethylated vegetable oil, alkyl phenoxy polyoxyethylene ethanol, sodium alkyl naphthalene sulfonate is also blended with the formulations.

In practice, the wettable powder is dispersed in water and applied as a liquid spray to the foliage of undesirable plants. Application rates should be sufficient to provide about 0.25 to 10 pounds per acre of the pyrazolium salt and, although 0.5 to 5.0 pounds per acre of said salt is generally satisfactory to control undesirable broadleaf weeds and undesirable grass plants, it should be recognized that rates exceeding 10 and as high as 20 pounds per acre can be used. These higher rates would, of course, be used in areas such as railroad sidings, beneath power lines and along hedge rows bordering property lines and fields.

In order to facilitate a further understanding of the invention, the following examples are presented primarily for the purpose of illustrating certain more specific details thereof. The invention is not to be deemed limited thereby except as defined in the claims. Unless otherwise noted, all parts are by weight.

EXAMPLE 1

Preparation of 1,3-Dicyclohexyl-1,3-Propanedione

Sodium hydride (39.5g. of 54%, 0.889 mole) is cooled with an icebath to 18°C. in a suitable flask fitted with stirrer, condenser, drying tube, dropping funnel and thermometer. Dimethyl sulfoxide (700 ml.), dried over 4A molecular sieves, is slowly added. After addition is complete, the reaction mixture is stirred for 0.5 hour at room temperature. The icebath is replaced and a mixture of cyclohexane-carboxylic acid, ethyl ester (138.8 g., 0.889 mole), and cyclohexyl methyl ketone (101.9 g., 0.80 mole) are added dropwise. No exotherm is observed. The reaction mixture becomes lighter in color and some bubbles are observed. After the addition has been completed, the icebath is removed and the reaction mixture is stirred overnight at room temperature. The thick, deep buff colored reaction mixture is poured over ice (8 liters) containing phosphoric acid (50 ml.) and extracted with ether. The ether is washed with water, dried and vacuum stripped to yield a golden yellow oil (204 g.) which smells strongly of the ester. The product is purified via the copper complex as set forth in the *Journal of Organic Chemistry* 13, 160 (1948) to yield white crystals having a melting point of 50°C. – 52°C.

Anal. Calc'd for $C_{15}H_{24}O_2$: C, 76.22; H, 10.24. Found: C, 76.20; H, 10.03.

Other β-diketones can be prepared from esters and ketones containing $R_3$ and $R_4$ as previously defined. Thus, 1-cyclopropyl-3-phenyl-1,3-propanedione has been reported by G. W. Cannon et al J. O. C. 17, 685 (1952) to be prepared as a solid, mp 36°C.-37°C., from ethyl benzoate and cyclopropyl methylketone in the presence of sodium amide. Alternatively, it has been found that the same compound, mp 38°C.-40°C. could be prepared from ethyl cyclopropanecarboxylate, acetophenone, and sodium hydride. J. T. Adams and C. R. Hauser in J. American Chemistry Society, 66, 1220, (1944) have prepared a series of 1-alkyl-3-phenyl 1,3-propanediones from carboxylic acid ethyl esters and acetophenone in the presence of sodium amide. Illustrative examples are tabulated employing the following equation:

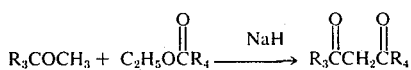

where $R_3$ and $R_4$ are set forth in the Table I below.

TABLE I

| $R_3$ | $R_4$ | Mp(°C.) | Appearance |
|---|---|---|---|
| phenyl | cyclopropyl | 38 – 40 | Cream crystals |
| phenyl | n—$C_5H_{11}$ | oil | Colorless oil, solidifies at n 0°C. |
| phenyl | n—$C_{11}H_{23}$ | 49 – 50 | Waxy white solid |
| phenyl | cyclohexyl | 48.5 – 50 | White solid |
| phenyl | cyclopentyl | (bp 155–160°/0.5 mm) | Colorless oil |
| phenyl | t—$C_4H_9$—phenyl | oil | Colorless oil |
| phenyl | —$CH_2$—phenyl | 49.5 – 51 | Long bright yellow needles |
| phenyl | cyclohexyl | oil | Orange oil |

Other propanediones which can be prepared by the above procedure using the appropriate carboxylic acid esters and substituted methyl ketones are:

1,3-Dicyclohexenyl-1,3-propanedione
1,3-Dicyclopentenyl-1,3-propanedione
1,3-Dicyclohexyl-1,3-propanedione
1-Phenyl-3-n-petnyl-1,3-propanedione
1-Phenyl-3-cycloheptane-1,3-propanedione
1-Phenyl-3-undecyl-1,3-propanedione
1,3-Dibenzyl-1,3-propanedione
1-Benzyl-3-cyclohexyl-1,3-propanedione
1-(1-Methylcyclohexyl)-3-phenyl-1,3-propanedione
1-(2-Methylcyclohexyl)-3-phenyl-1,3-propanedione
1,3-Di-t-butyl-1,3-propanedione
1-Cyclohexyl-3-(m-tolyl)-1,3-propanedione
1-Cyclohexyl-3-(o-fluorophenyl)-1,3-propanedione
1-(p-Chlorophenyl)-3-cyclopentyl-1,3-propanedione
1-(p-Bromophenyl)-3-cyclohexyl-1,3-propanedione
1-Benzyl-3-(p-methylthiobenzyl)-1,3-propanedione
1-Cyclohexyl-3-(p-cyanophenyl)-1,3-propanedione
1-Cyclohexyl-3-(m-trifluoromethylphenyl)-1,3-propanedione
1-p-Anisyl-3-n-hexyl-1,3-propanedione
1-Cyclohexylmethyl-3-phenyl-1,3-propanedione
1,3-Dicyclopropylmethyl-1,3-propanedione
1,3-Dicyclopropyl-1,3-propanedione
1-Cyclohexyl-3-ethyl-1,3-propanedione
1-Cyclopentyl-3-phenyl-1,3-propanedione
1,3-Dicyclohexylmethyl-1,3-propanedione
1-Cyclohexyl-3-(p-methylsulfonylphenyl)-1,3-propanedione
1-(2-Carboxyphenyl)-3-cyclohexyl-1,3-propanedione, as the disodium salt
1-(2-Carboxyphenyl)-3-cyclopentyl-1,3-propanedione, as the disodium salt
1-Benzyl-3-(2-carboxyphenyl)-1,3-propanedione, as the disodium salt

EXAMPLE 2

Preparation of
3-Cyclopropyl-1-methyl-5-phenylpyrazole and
5-Cyclopropyl-1-methyl-3-phenylpyrazole 1-Cyclopropyl-3-phenyl-1,3-propanedione (37.6 g., 0.2 mole) and 2-propanol (250 ml.) are heated to reflux. Methyl hydrazine (10.2 g., 0.22 mole) is then added dropwise, and the solution refluxed until the reaction is complete (2.5 hours). The solution is then filtered and vacuum stripped to give a yellow oil (39.2 g., 99 percent). Examination of the product on a silica gel tlc plate developing with chloroform and iodine shows the presence of an impurity. The product is chromatographed on silica gel with chloroform to give a white, cloudy oil.

Anal. Calc'd for $C_{13}H_{14}N_2$: C, 77.68; H, 7.26; N, 13.52. Found: C, 77.92; H, 7.33; N, 13.56.

The following pyrazoles of the structure:

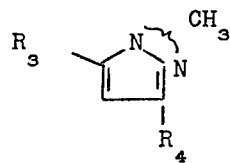

are prepared by the method of this Example, employing the appropriate 1,3-propanedione as a substitute for 1-cyclopropyl-3-phenyl-1,3-propanedione. The results of the process are set forth in Table II below.

TABLE II

| $R_4$ | $R_3$ | Mp°C | Appearance | Method of Purification |
|---|---|---|---|---|
| cyclopropyl | phenyl | Oil | Yellow Oil | Chromatographed on silica gel with $CHCl_3$ |
| n—$C_5H_{11}$ | phenyl | Oil | Colorless Oil | Distillation followed by chromatography on alumina with $CHCl_3$ |

TABLE II—Continued

| R₄ | R₃ | Mp°C | Appearance | Method of Purification |
|---|---|---|---|---|
|  |  | Oil | Yellow Oil | Via the hydrochloride salt |
|  |  | 47 | White Solid | Recrystallization from n-pentane |
| (CH₃)₃C— |  | Oil | Yellow Orange Oil | Filtered through neutral alumina with 2-propanol |
| n—C₁₁H₂₃ |  | Oil | Yellow Oil | Low temperature recrystallization from hexane |
|  |  | 78–80 | | Low temperature recrystallization from hexane |
|  |  | Oil | Yellow Oil | Low temperature recrystallization from hexane |
| n—C₅H₁₁ |  | Oil | Yellow Oil | Low temperature recrystallization from hexane |
|  |  | 47° | | Low temperature recrystallization from hexane |
|  |  | Oil | Yellow Oil | Low temperature recrystallization from hexane |
| n—C₁₁H₁₃ |  | Oil | Yellow Oil | Low temperature recrystallization from hexane |

Other pyrazoles that can be prepared by the above procedure employing the appropriate 1,3-propanediones are:
3,5-Dicyclohexenyl-1-methylpyrazole
3,5-Dibenzyl-1-methylpyrazole
3,5-Di-t-butyl-1-methylpyrazole
3,5-Dicyclopropyl-1-methylpyrazole
3-Benzyl-5-cyclohexenyl-1(and 2)-methylpyrazole
1-(and 2)-Methyl-3-(1-methylcyclohexyl)-5-phenylpyrazole
1-(and 2)-Methyl-3-(2-methylcyclohexyl)-5-phenylpyrazole
3-Cyclohexyl-1(and 2)-methyl-5-(m-tolyl)pyrazole
3-Cyclohexyl-5-(o-fluorophenyl)-1(and 2)-methylpyrazole
3-(p-Chlorophenyl)-5-cyclopentyl-1(and 2)-methylpyrazole
3-(p-Bromophenyl)-5-cyclohexyl-1(and 2)-methylpyrazole
3-Benzyl-1(and 2)-methyl-5-(p-methylthiobenzyl)pyrazole
3,5-(p,p'-Dichlorobenzyl)-1-metheylpyrazole
3-Cyclohexyl-5-(p-cyanophenyl)-1(and 2)-methylpyrazole
3-Cyclohexyl-1(and 2)-methyl-5-(m-trifluoromethylphenyl) pyrazole 3-(p-Anisyl)-5-n-hexyl-1(and 2)-methylpyrazole
3-Cyclohexylmethyl-1(and 2)-methyl-5-phenylpyrazole
3,5-Di(cyclohexylmethyl)-1-methylpyrazole
3-Cyclohexyl-5-ethyl-1(and 2)-methylpyrazole
3-Cyclopentylmethyl-1(and 2)-methyl-5-phenylpyrazole Additionally, employing hydrazines other than methylhydrazine, there are obtained:

3,5-Dicyclohexyl-1-ethylpyrazole
1-t-Butyl-3,5-dicyclohexylpyrazole
3-(2-Carbomethoxyphenyl)-5-cyclohexyl-1(and 2)-methylpyrazole
3-(2-Carbomethoxyphenyl)-5-cyclopentyl-1(and 2)-methylpyrazole
3-(2-Carboxyphenyl)-5-cyclohexyl-1(and 2)-methylpyrazole
3-(2-Carboxyphenyl)-5-cyclopentyl-1(and 2)-methylpyrazole
3-Benzyl-5-(2-Carboxyphenyl)-1(and 2)-methylpyrazole and
3-(2-Carbomethoxyphenyl)-5-cyclohexenyl-1(and 2)-methylpyrazole

EXAMPLE 3

Preparation of
3-Cyclohexyl-1,2-dimethyl-phenylpyrazolium methylsulfate

In suitable reaction vessel, 1-Methyl-3(5)-cyclohexyl-5(3)-phenyl pyrazole (8.0 g., 0.033 mole) is dissolved in dry toluene and warmed to ~65°C. Dimethyl sulfate (4.5 g., 0.035 mole) is then added and the mixture is brought to reflux. Tlc (benzene) after 1½ hours shows a small amount of pyrazole remaining. After 2 hours the reaction mixture begins darkening and heating is discontinued. On cooling a white solid forms which is filtered and washed with dry toluene. This tacky white solid is vacuum-dried at room temperature to give a brittle solid. Hexane is then added and the solid broken up and collected by filtration. The solid (6.3 g., 50% yield) has mp 48°–51°C. On exposure to air it becomes tacky (hygroscopic). On analysis the following is noted.

Anal. Calc'd. for $C_{18}H_{26}N_2SO_4 \cdot H_2O$: C, 56.24; H, 7.34; N, 7.29 Found: C, 56.91; H, 7.33; N, 7.12.

EXAMPLE 4

Preparation of
5-Cyclopropyl-1,2-dimethyl-3-phenylpyrazolium methyl sulfate

A mixture of 3-cyclopropyl-1-methyl-5-phenylpyrazole and 5-cyclopropyl-1-methyl-3-phenylpyrazole (33.1 g., 0.167 mole) and dry toluene (250 ml.) are heated to reflux and approximately 25 ml. of solvent removed with a Dean Stark trap. The solution is next cooled and dimethyl sulfate (18 ml., 0.193 mole) added. The reaction mixture is held at 100°C. for 2.5 hours. A yellow brown oil is formed which solidifes upon cooling. The solid is removed by filtration and dried under vacuum giving a cream colored solid (49.5 g., 91.5 percent) having a melting point equal to 163°C.–170°C. whose analysis is as follows:

Anal. Calc'd for $C_{15}H_{20}N_2SO_4$: C, 55.54; H, 6.22; N, 8.64; S, 9.89. Found: C, 55.27; H, 6.23; N, 9.48; S, 9.99.

Following the procedure of the above example, the compounds in Table III below are prepared by substituting the appropriate 1-methyl pyrazole for 3-cyclopropyl-1-methyl-5-phenyl-pyrazole and having the generic formula:

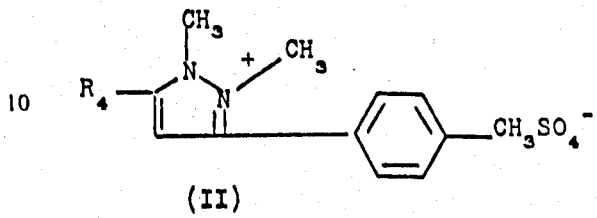

(II)

TABLE III

| $R_4$ | Melting Point (°C.) | Appearance |
|---|---|---|
| ▷ | 157 | Off white crystals |
| n—$C_5H_{11}$ | oil | Viscous brown oil |

Additional pyrazolium compounds that can be prepared by the procedure of Example 4 are as follows:

3-Cyclohexyl-1,2-dimethyl-5-(m-tolyl)pyrazolium methyl sulfate
3-Cyclohexyl-1,2-dimethyl-5-(o-fluorophenyl)-pyrazolium methyl sulfate
3-(p-Bromophenyl)-5-cyclohexyl-1,2-dimethylpyrazolium methyl sulfate
3,5-(p,p'-Dichlorobenzyl)-1,2-dimethylpyrazolium methyl sulfate
3-Cyclohexyl-1,2-dimethyl-5-(m-trifluoromethyl phenyl) pyrazolium methyl sulfate
3-(p-Anisyl)-1,2-dimethyl-5-n-hexylpyrazolium methyl sulfate
3-Cyclohexyl-1,2-dimethyl-5-ethylpyrazolium methyl sulfate
3,5-Dicyclohexyl-1-ethyl-2-methylpyrazolium methyl sulfate
3-(2-Carbomethoxyphenyl)-5-cyclohexyl-1,2-dimethylpyrazolium methyl sulfate
3-(2-Carbomethoxyphenyl)-5-cyclopentyl-1,2-dimethylpyrazolium methyl sulfate The following pyrazoles when reacted with dimethyl sulfate, using the above method, yield products which are a mixture of methyl sulfate and hydrogen sulfate salts. In such instances, the products are converted completely to the iodides and/or perchlorate salts by dissolving in water and treating the same with saturated potassium (or sodium) iodide or dilute perchloric acid, respectively. For instance, utilizing either

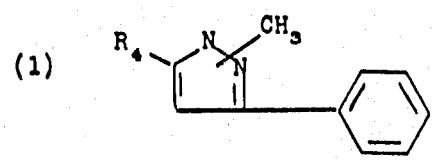

(1)

where $R_4$ is n-$C_{11}H_{23}$, $(CH_3)_3C$-, cycloheptyl-, or (2) 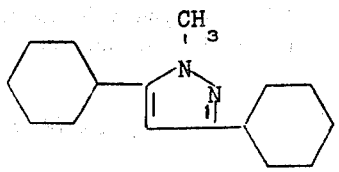

the methyl sulfate/hydrogen sulfate salts, when employing the undecyl- and cycloheptyl groups, do not separate upon cooling the reaction mixture. In these cases, the reaction mixture is vacuum-stripped, the residue dissolved in water and used for making the iodide and/or perchlorate without any solvent extraction.

EXAMPLE 5

Preparation of 5-Cyclopropyl-1,2-dimethyl-3-phenylpyrazolium perchlorate

An aqueous solution (500 ml.) containing 10 g. of 5-cyclopropyl-1,2-dimethyl-3-phenylpyrazolium methyl sulfate is extracted with ether. The aqueous layer is separated and treated with dilute perchloric acid (10 ml.) to give a solid. After stirring for one hour, the solid is removed by filtration and dried to give a cream-colored solid (6.1 g., 60 percent) with melting point 160°C. to 161°C. On analysis, the following is obtained:

Anal. Calc'd. for $C_{14}H_{17}ClN_2O_4$: C, 53.75; H, 5.48; N, 8.96; Cl, 11.34. Found: C, 54.0; H, 5.40; N, 8.90; Cl, 11.48.

As noted in Table IV below, several exemplary perchlorates are prepared by the method as described in Example 5 above, using the appropriate pure, technical or crude 1,2-dimethyl-3,5-substituted pyrazolium methyl sulfate salt as starting material of the structure:

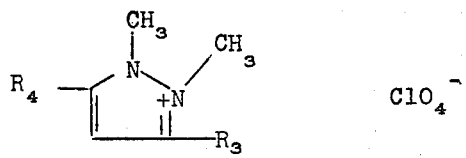

Several compounds which can be prepared by the above procedure are:

3,5-Dibenzyl-1,2-dimethylpyrazolium perchlorate
3,Benzyl-5-cyclohexenyl-1,2-dimethylpyrazolium perchlorate
1,2-Dimethyl-3-(1-methylcyclohexyl)-5-phenylpyrazolium perchlorate
3-Benzyl-1,2-dimethyl-5-(p-methylthiophenyl)-pyrazolium perchlorate
3-Cyclohexylmethyl-1,2-dimethyl-5-phenylpyrazolium perchlorate
3,5-Dicyclohexylmethyl-1,2-dimethylpyrazolium perchlorate
3-Benzyl-5-(2-carboxyphenyl)-1,2-dimethylpyrazolium perchlorate
3-Benzyl-5-(2-carbomethoxyphenyl)-1,2-dimethylpyrazolium perchlorate 3-Benzyl-5-(2-carbomethoxyphenyl)-1,2-dimethylpyrazolium perchlorate In addition, compounds related to pyrazolium perchlorate salts were prepared, e.g., 1-t-Butyl-3,5-dicyclohexyl-2-methylpyrazolium perchlorate salt.

EXAMPLE 6

Preparation of 5-Cyclopropyl-1,2-dimethyl-3-phenylpyrazolium iodide

A solution of 5-cyclopropyl-1,2-dimethyl-3-phenylpyrazolium methyl sulfate (12.3 g.) dissolved in water (100 ml.) is extracted with ether. The aqueous layer is separated and treated with a saturated aqueous solution of potassium iodide. After stirring for 0.5 hours, the solid is separated by filtration and dried to give a straw-colored solid (4.7 g., 36%) with melting point 150°C. to 152°C. On analysis, the following is noted.

TABLE IV

| $R_4$ | $R_3$ | mp° (°C) | Appearance |
|---|---|---|---|
| cyclopropyl | phenyl | 75-76 | Off-white Solid |
| n-$C_5H_{11}$ | cyclohexyl | 102-103 | Off-white Solid |
| -C(CH$_3$)$_3$ | cyclohexyl | 142-146 | Cream-colored Solid |
| cyclohexyl | cyclohexyl | 115-116 | Off-white Solid |
| -CH$_2$-phenyl | cyclohexyl | 118-119.5 | White Solid |
| cyclohexyl | cyclohexyl | 73-80 | Beige Solid |

Anal. Calc'd. for $C_{14}H_{17}N_2I$: C, 49.42; H, 5.04; N, 8.24. Found: C, 49.07; H, 5.06; N, 8.16.

Illustrative iodides in Table V below are prepared by the method as described above in Example 6, substituting the appropriate pyrazolium methyl sulfate salt for 5-cyclopropyl-1,2-dimethyl-3-phenyl-pyrazolium methyl sulfate of the structure:

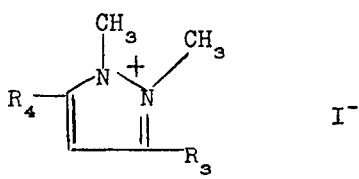

TABLE V

| $R_4$ | $R_3$ | mp(°C) | Appearance |
|---|---|---|---|
| cyclopropyl | phenyl | — | — |
| cyclohexyl | phenyl | — | — |
| n—$C_{11}H_{23}$ | phenyl | 74–76 | Buff-colored Solid |
| cyclohexyl | cyclohexyl | 226–227 | Cream-colored Solid |

Illustrative compounds which are prepared by the above procedure are as follows:

3,5-Dicyclohexenyl-1,2-dimethylpyrazolium iodide
3,5-Di-t-butyl-1,2-dimethylpyrazolium iodide
3,5-Dicyclopropylmethyl-1,2-dimethylpyrazolium iodide
3,5-Dicyclopropyl-1,2-dimethylpyrazolium iodide
3,5-Dicyclopropyl-1,2-dimethylpyrazolium iodide
1,2-Dimethyl-3-(2-methylcyclohexyl)-5-phenylpyrazolium iodide
3-(p-Chlorophenyl)-5-cyclopentyl-1,2-dimethylpyrazolium iodide
3-Cyclohexyl-5-(p-cyanophenyl)-1,2-dimethylpyrazolium iodide
3-Cyclopentylmethyl-1,2-dimethyl-5-phenylpyrazolium iodide
3-(2-Carbomethoxyphenyl)-5-cyclohexenyl-1,2-dimethylpyrazolium iodide
3-(2-Carboxyphenyl)-5-cyclohexyl-1,2-dimethylpyrazolium iodide
3-(2-Carboxyphenyl)-5-cyclopentyl-1,2-dimethylpyrazolium iodide

EXAMPLE 7

The selective postemergence herbicidal activity of the compounds of the present invention is demonstrated by the following tests, wherein a variety of monocotyledonous and dicotyledonous plants are treated with test compounds dispersed in aqueous acetone mixtures. In the tests, seedling plants are grown in jiffy flats for about two weeks. The test compounds are dispersed in 50/50 acetone/water mixtures containing 0.5% Tween 20, a polyoxyethylene sorbitan monolaurate surfactant of Atlas Chemical Industries, in sufficient quantity to provide the equivalent of about 0.5 lb. to 4 lbs. per acre of active compound when applied to the plants through a spray nozzle operating at 40 psi for a predetermined time. After spraying, the plants are placed on greenhouse benches and are cared for in the usual manner, commensurate with conventional greenhouse practices. Five weeks after treatment, the seedling plants are examined and rated according to the rating system provided below. The data obtained are reported in Tables VI and VII below where it can be seen that the compounds are highly effective for the control of many broadleaf weeds and undesirable grass plants.

| Rating System: | % Difference in Growth From the Check[1] |
|---|---|
| 0 - no effect | 0 |
| 1 - possible effect | 1 – 10 |
| 2 - slight effect | 11 – 25 |
| 3 - moderate effect | 26 – 40 |
| 5 - definite injury | 41 – 60 |
| 6 - herbicidal effect | 61 – 75 |
| 7 - good herbicidal effect | 76 – 90 |
| 8 - approaching complete kill | 91 – 99 |
| 9 - complete kill | 100 |
| 4 - Abnormal growth, that is, a definite physiological malformation but with an over-all effect less than a 5 on the rating scale. | |

[1]-Based on visual determination of stand, size, vigor, chlorosis growth malformation and over-all plant appearance.

Plant Abbreviation

MU - Mustard
  (*Brassica kaber*)
PI - Pigweed
  (*Amaranthus retroflexus*)
BA - Barnyard grass
  (*Echinochloa crusgalli*)
CR - Crabgrass
  (*Digitaria sanguinalis*)
WO - Wild Oats
  (*Avena fatua*)
WH - Wheat
  (*Triticum aestivum*)
MG - Morning glory
  (*Ipomoea purpurea*)
Barley - (*Hordeum vulgare*)
VL - Velvetleaf
  (*Abutilon theophrasti*)
FO - Green Foxtail
  (*Setaria viridis*)
RI - Rice
  (*Oryza sativa*)

TABLE VI
| Structure | Lb./Acre | Postemergence Herbicidal Activity | | | | | | | | | | |
|---|---|---|---|---|---|---|---|---|---|---|---|---|
| | | Barley | MU. | WH. | Pl. | Ba. | CR. | FO. | WO. | MG. | RI. | WO. | VL. |
| 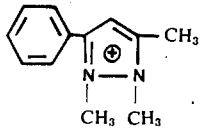 | 4 | 0 | 0 | 0 | 0 | 0 | 2 | 1 | 0 | 0 | 0 | 0 | 2 |
| | 1 | 0 | 0 | 0 | 0 | 0 | 0 | 1 | 0 | 0 | 0 | 0 | 0 |
| | ½ | 0 | 0 | 0 | 0 | 0 | 0 | 0 | 0 | 0 | 0 | 0 | 0 |
| 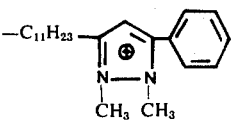 | 4 | 0 | 9 | 0 | 9 | 0 | 0 | 0 | 0 | 9 | 0 | 0 | 9 |
| | 1 | 0 | 9 | 0 | 9 | 0 | 0 | 0 | 0 | 8 | 0 | 0 | 1 |
| | ½ | 0 | 7 | 0 | 9 | 0 | 0 | 0 | 0 | 3 | 0 | 0 | 1 |
| 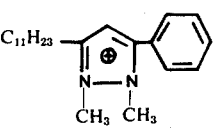 | 4 | 0 | 9 | 1 | 9 | 0 | 0 | 1 | 0 | 9 | 0 | 0 | 3 |
| | 1 | 0 | 7 | 0 | 9 | 0 | 0 | 0 | 0 | 7 | 0 | 0 | 0 |
| | ½ | 0 | 7 | 0 | 9 | 0 | 0 | 0 | 0 | 3 | 0 | 0 | 0 |
| 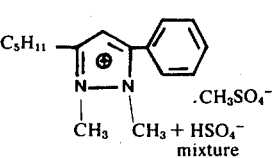 | 4 | 0 | 9 | — | 9 | 8 | 9 | 6 | 2 | 8 | 0 | 3 | 9 |
| | 1 | 0 | 9 | — | 9 | 7 | 8 | 6 | 0 | 8 | 0 | 0 | 2 |
| | ½ | 0 | 8 | — | 7 | 5 | 2 | 6 | 0 | 5 | 0 | 0 | 1 |
TABLE VII
| Structure | Lb./Acre | Postemergence Herbicidal Activity | | | | | | | | | | |
|---|---|---|---|---|---|---|---|---|---|---|---|---|
| | | Barley | MU. | WH. | Pl. | Ba. | CR. | FO. | WO. | MG. | RI. | WO. | VL. |
| 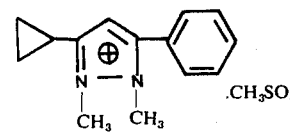 | 4 | 0 | 8 | 3 | 7 | 5 | 8 | 2 | 0 | 1 | 0 | 0 | 9 |
| | 1 | 0 | 3 | 0 | 0 | 0 | 5 | 0 | 0 | 0 | 0 | 0 | 1 |
| | ½ | 0 | 3 | 0 | 0 | 0 | 0 | 0 | 0 | 0 | 0 | 0 | 1 |
| 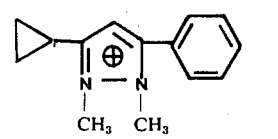 | 4 | 0 | 5 | 1 | 8 | 1 | 8 | 1 | 0 | 1 | 0 | 0 | 0 |
| | 1 | 0 | 1 | 0 | 2 | 0 | 5 | 1 | 0 | 0 | 0 | 0 | 0 |
| | ½ | 0 | 0 | 0 | 0 | 0 | 3 | 0 | 0 | 0 | 0 | 0 | 0 |
| 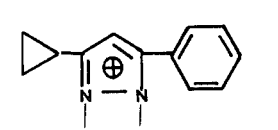 | 4 | 0 | 6 | 3 | 5 | 2 | 3 | 7 | 1 | 1 | 0 | 1 | 9 |
| | 1 | 0 | 0 | 0 | 0 | 0 | 0 | 1 | 0 | 0 | 0 | 0 | 9 |
| | ½ | 0 | 0 | 0 | 0 | 0 | 0 | 0 | 0 | 0 | 0 | 0 | 0 |
| 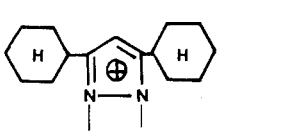 | 4 | 0 | 9 | 7 | 9 | 5 | 8 | 9 | 9 | 8 | 0 | 9 | 9 |
| | 1 | 0 | 7 | 7 | 9 | 1 | 4 | 6 | 8 | 6 | 0 | 8 | 6 |
| | ½ | 0 | 6 | 5 | 7 | 0 | 4 | 0 | 5 | 6 | 0 | 6 | 5 |

TABLE VII -Continued

| Structure | | Lb./Acre | Barley | MU | WH | PI | Ba | CR | FO | WO | MG | RI | WO | VL |
|---|---|---|---|---|---|---|---|---|---|---|---|---|---|---|
| cyclopentyl-pyrazolium, N,N-diCH₃, 3-phenyl | CH₃SO₄⁻ ½H₂O | 4 | 0 | 9 | 7 | 9 | 0 | 7 | 7 | 6 | 9 | 5 | 7 | 9 |
| | | 1 | 0 | 7 | 7 | 0 | 0 | 1 | 0 | 2 | 3 | 0 | 1 | 9 |
| | | ½ | 0 | 5 | 3 | 0 | 0 | 0 | 0 | 0 | 1 | 0 | 0 | 9 |
| cycloheptyl analog | I⁻ | 4 | 0 | 9 | 5 | 9 | 5 | 8 | 7 | 7 | 9 | 6 | 6 | 9 |
| | | 1 | 0 | 6 | 0 | 9 | 1 | 4 | 1 | 0 | 7 | 1 | 0 | 6 |
| | | ½ | 0 | 3 | 0 | 7 | 1 | 4 | 0 | 0 | 3 | 0 | 0 | 5 |
| cyclohexyl analog | ClO₄⁻ | 4 | 0 | 9 | 2 | 9 | 2 | 9 | 3 | 5 | 2 | 5 | 5 | 7 |
| | | 1 | 0 | 5 | 0 | 6 | 1 | 4 | 0 | 3 | 2 | 1 | 5 | 5 |
| | | ½ | 0 | 3 | 0 | 7 | 1 | 4 | 0 | 1 | 2 | 0 | 2 | 3 |
| cyclohexyl analog | I⁻ | 4 | 0 | 9 | 2 | 9 | 2 | 8 | 7 | 8 | 1 | 5 | 8 | 7 |
| | | 1 | 0 | 2 | 0 | 3 | 1 | 4 | 1 | 3 | 2 | 1 | 3 | 3 |
| | | ½ | 0 | 2 | 0 | 1 | 1 | 4 | 0 | 1 | 3 | 0 | 2 | 3 |
| cyclopentyl analog | ClO₄⁻ | 4 | 2 | 9 | 0 | 9 | 2 | 9 | 1 | 0 | 1 | 3 | 0 | 7 |
| | | 1 | 0 | 6 | 0 | 9 | 1 | 5 | 0 | 0 | 1 | 1 | 0 | 2 |
| | | ½ | 0 | 6 | 0 | 8 | 0 | 5 | 0 | 0 | 1 | 0 | 0 | 1 |
| cyclohexyl analog | CH₃SO₄ | 4 | 0 | 9 | 1 | 3 | 2 | 0 | 2 | 5 | 5 | 0 | 7 | 9 |
| | | 1 | 0 | 0 | 0 | 0 | 0 | 0 | 0 | 7 | 1 | 0 | 8 | 3 |
| | | ½ | 0 | 0 | 0 | 0 | 0 | 0 | 0 | 7 | 1 | 0 | 8 | 3 |
| | | 4 | 0 | 9 | — | 9 | 7 | 9 | 8 | 9 | 7 | 5 | 9 | 6 |
| dicyclohexyl analog | ClO₄⁻ | 1 | 0 | 8 | — | 6 | 4 | 8 | 1 | 8 | 6 | 5 | 7 | 6 |
| | | ½ | 0 | 7 | — | 0 | 4 | 7 | 1 | 7 | 5 | 5 | 8 | 1 |
| | | 4 | 0 | 8 | 0 | 9 | 0 | 0 | 3 | 0 | 9 | 0 | 0 | 8 |
| benzyl-phenyl analog | Cl·H₂O | 1 | 0 | 2 | 0 | 9 | 0 | 0 | 0 | 0 | 6 | 0 | 0 | 2 |
| | | ½ | 0 | 0 | 0 | 0 | 0 | 0 | 0 | 0 | 0 | 0 | 0 | 0 |

EXAMPLE 8

The preemergence activity of the compounds of the present invention is demonstrated by the following tests wherein a 50/50 acetone/water mixture containing 0.5% v/v Tween-20 surfactant and sufficient test compound provide 10 pounds per acre of said compound when the mixture is applied to pots planted with seeds of test plant species.

The pots are prepared the day of herbicide treatment by putting 100 ml. of soil in each plastic pot as a base, then morning glory, tomato, wild oats and nutsedge seeds are placed on this base and covered with 50 ml. (⅜ to ½ inch) of soil. Seeds of each of the other 8 plant species identified below are separately mixed with soil and 50 ml. of the soil seed mix added to the pot. The pots are then tamped to level the soil and the soil is prewetted with water prior to herbicide application. This prewetting insures that the herbicide treatment solution spreads evenly over the surface of the pot and protects the weed seeds from acetone injury. Each of the 12 weed species is contained in a separate pot. The pots are then arranged in 10 × 12 inch flats prior to chemical treatment.

The planted pots are treated with 5 ml. of test solution and then placed on benches in the greenhouse. Pots are watered after treatment and held in the greenhouse for three weeks at which time the results are recorded, as reported below in Table VIII.

Plant Species Used in Preemergence Herbicide Evaluation

| Common Name | Abbreviation | Scientific Name |
|---|---|---|
| Nutsedge | NS | Cyperus rotundus |
| Lambsquarters | LA | Chenopodium album |
| Wild Mustard | MU | Brassica kaber |
| Pigweed | PI | Amaranthus retroflexus |
| Ragweed | RW | Ambrosia artemisiifolia |
| Morningglory | MG | Ipomoea purpurea |
| Barnyardgrass | BA | Echinochloa crusgalli |
| Crabgrass | CR | Digitaria sanguinalis |
| Green Foxtail | FO | Setaria viridis |
| Wild Oats | WO | Avena fatua |
| Tomato | TO | Lycopersicon esculentum |
| Velvetleaf | VL | Abutilon theophrasti |

The rating system used in these tests is the same as described in Example 7 above.

TABLE VIII

| Structure | lb/Acre | Preemergence Herbicidal Activity | | | | | | | | | | | |
|---|---|---|---|---|---|---|---|---|---|---|---|---|---|
| | | NS | LA | MU | PI | RW | MG | BA | CR | FO | WO | TO | VL |
| —$C_5H_{11}$ pyrazolium-phenyl, $CH_3$, $CH_3$, $ClO_4^-$ | 10 | 0 | 9 | 9 | 9 | 0 | 5 | 7 | 8 | 2 | 0 | 5 | 0 |
| —$C_5H_{11}$ pyrazolium-phenyl, $CH_3$, $CH_3$, $CH_3SO_4^-$ +$HSO_4^-$ | 10 | 0 | 6 | 9 | 9 | 9 | 0 | 8 | 9 | 8 | 0 | 0 | 0 |
| H-cyclohexyl pyrazolium H-cyclohexyl, $CH_3$, $CH_3$, $I^-$ | 10 | 0 | 0 | 4 | 8 | 0 | 4 | 5 | 8 | 7 | 4 | 4 | 7 |
| H-phenyl pyrazolium H-phenyl, $CH_3$, $CH_3$, $ClO_4^-$ | 10 | 2 | 6 | 4 | 8 | 5 | 4 | 7 | 8 | 7 | 4 | 0 | 5 |
| $(CH_3)_3C$ pyrazolium-phenyl, $CH_3$, $CH_3$, $ClO_4^-$ | 10 | 0 | 0 | 0 | 0 | 0 | 0 | 3 | 1 | 3 | 3 | 1 | 0 |
| H-cyclopentyl pyrazolium-phenyl, $CH_3$, $CH_3$, $ClO_4^-$ | 10 | 0 | 0 | 4 | 9 | 0 | 0 | 0 | 0 | 0 | 4 | 0 | 0 |
| H-cycloheptyl pyrazolium-phenyl, $CH_3$, $CH_3$, $I^-$ | 10 | 4 | 0 | 4 | 4 | 9 | 0 | 4 | 8 | 3 | 9 | 2 | 9 |

TABLE VIII—Continued

| Structure | lb/Acre | Preemergence Herbicidal Activity | | | | | | | | | | |
|---|---|---|---|---|---|---|---|---|---|---|---|---|
| | | NS | LA | MU | PI | RW | MG | BA | CR | FO | WO | TO | VL |
| 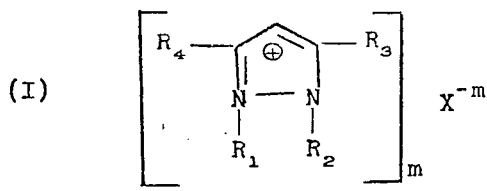 .I⁻ | 10 | 0 | 8 | 3 | 3 | 2 | 1 | 4 | 7 | 2 | 7 | 4 | 5 |
| (similar structure) .ClO₄⁻ | 10 | 0 | 0 | 3 | 8 | 0 | 0 | 4 | 8 | 0 | 4 | 2 | 1 |

We claim:

1. A compound having the formula:

(I) 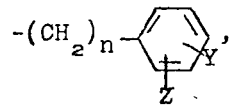

wherein $R_1$ and $R_2$ each represents alkyl $C_1$–$C_4$; $R_3$ represents a member selected from the group consisting of cycloalkylmethyl $C_3$–$C_7$, cycloalkyl $C_3$–$C_7$, methyl-substituted cycloalkyl $C_3$–$C_7$; cycloalkenyl $C_3$–$C_7$, methyl-substituted cycloalkenyl $C_3$–$C_7$,

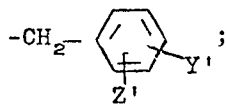

and alkyl $C_2$–$C_{11}$; $R_4$ represents a member selected from the group consisting of cycloalkylmethyl $C_3$–$C_7$, cycloalkyl $C_3$–$C_7$, methyl-substituted cycloalkyl $C_3$–$C_7$, cycloalkenyl $C_3$–$C_7$, methyl-substituted cycloalkenyl $C_3$–$C_7$, alkyl $C_2$–$C_{11}$ and

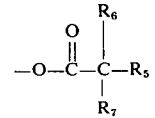;

Y, Y', Z and Z' each represents members selected from the group consisting of hydrogen, halogen, nitro, methylthio, methylsulfonyl, cyano, carboxyl, carboalkoxy $C_1$–$C_4$, alkyl $C_1$–$C_4$, haloalkyl $C_1$–$C_4$ containing 1 to 4 halogen groups and alkoxy $C_1$–$C_4$; X represents an anion with a charge of from 1 to 3; $n$ is 0 or 1 and $m$ is an integer from 1 to 3.

2. The compound according to claim 1 wherein $R_3$ is phenyl, $R_4$ is alkyl $C_2$–$C_{11}$.

3. The compound according to claim 1 wherein $R_3$ and $R_4$ are each cycloalkyl $C_3$–$C_7$.

4. The compound according to claim 1 wherein $R_3$ is phenyl and $R_4$ is cycloalkyl $C_3$–$C_7$.

5. The compound according to claim 1 wherein $R_3$ benzyl and $R_4$ is phenyl.

6. The compound according to claim 2 wherein $R_1$ and $R_2$ are each methyl.

7. The compound according to claim 2 wherein the alkyl substituent of $R_4$ is n-pentyl.

8. The compound according to claim 2 wherein the alkyl substituent of $R_4$ is undecyl.

9. The compound according to claim 3 wherein $R_1$ and $R_2$ are each methyl and $R_3$ and $R_4$ are each cyclohexyl.

10. The compound according to claim 4 wherein $R_1$ and $R_2$ are methyl, $R_3$ is phenyl and $R_4$ is cyclohexyl.

11. The compound according to claim 1 wherein X represents a member selected from the group consisting of a halide, sulfate, hydrogen sulfate, methyl sulfate, benzene sulfonate, perchlorate, $C_1$–$C_4$ alkoxybenzene sulfonate, $C_1$–$C_4$ benzene sulfonate, $C_1$–$C_4$ alkane sulfonate,

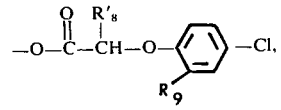

where $R_5$ is halogen, methyl, halomethyl, or dihalomethyl, $R_6$ and $R_7$ are each halogen, $R_8$ is hydrogen or methyl and $R_9$ is chlorine or methyl.

* * * * *